Figure 2A:
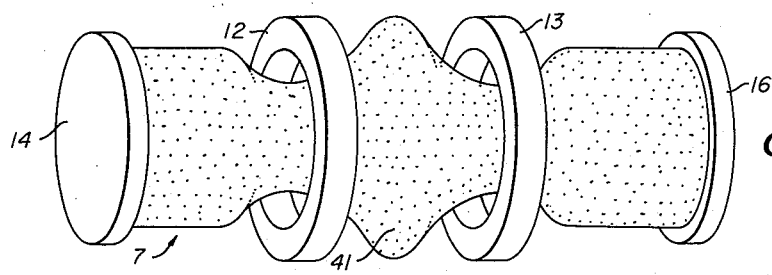

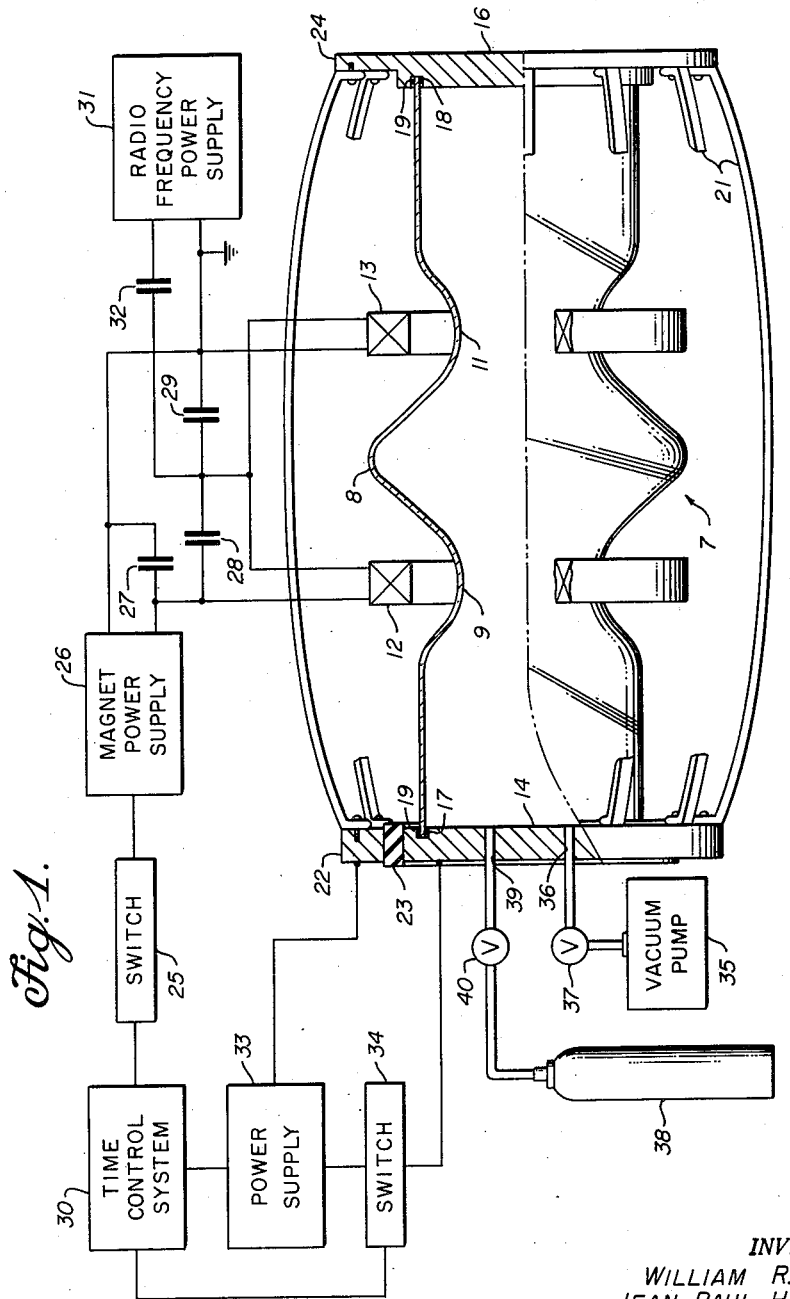

INVENTORS.
WILLIAM R. BAKER
JEAN PAUL H. WATTEAU
BY

ATTORNEY.

United States Patent Office 3,038,099
Patented June 5, 1962

3,038,099
CUSP-PINCH DEVICE
William R. Baker, Orinda, Calif., and Jean Paul H. Watteau, Colombes, France, assignors to the United States of America as represented by the United States Atomic Energy Commission
Filed Aug. 26, 1960, Ser. No. 52,317
10 Claims. (Cl. 313—161)

The present invention relates to apparatus for producing, containing and heating an electrical plasma and more particularly to a device for creating a plasma by means of an electrical discharge through a gas and utilizing a magnetic field to enhance containment of the plasma.

Various means have been developed for containing and heating electrical plasmas, which plasmas are comprised of approximately equal numbers of positive ions and free electrons. Not only may the heated plasmas be extracted and utilized for various purposes but the number of fusion reactions occurring within the plasma is increased with a rise in plasma temperature, assuming that the plasma is formed from a suitable gas or mixture of gases such as deuterium and tritium. Such fusion reactions produce either highly energized neutrons or highly energized protons. The charged protons are retained in the plasma and increase the temperature thereof still further while the neutrons are emitted from the plasma body; thus the device may be utilized as a neutron source. If the plasma is sufficiently heated, the obtainable energy of the particles resulting from the fusion reactions may exceed the input energy and provide useful power.

There are various ways in which a plasma body may be created and contained. In the present invention an axially symmetric magnetic field is created which has a cuspate containment configuration along any longitudinal section. In some of the previous devices utilizing cuspate fields, the field is first created and a plasma injected into the field from an external source. However in the present invention a plasma body is first produced by a linear pinch type discharge and the cuspate magnetic field is then formed around the plasma. The linear pinch discharge is formed between two electrodes disposed at opposite ends of a gas filled chamber. A very heavy current from an external power source is passed between the two electrodes, ionizing the intermediate gas to form a highly conductive plasma. The current through the plasma provides a magnetic field which constricts or pinches the plasma into a column. To supplement the inherent magnetic field of the plasma current, the additional cuspate magnetic field is then formed around the plasma column and further compression and heating occurs.

Without the additional field, the plasma column alone becomes unstable soon after it is formed, kink and interchange instabilities occurring which disrupt the column and cause the compressed plasma to disperse. In the present invention, the cusp magnetic field is formed around the plasma column after the column is formed but before the plasma column is disrupted by the instabilities. In general, the operation of the device might be considered to occur in two stages, there first being a pinch compression stage followed by a magnetic containment stage. During the latter stage the desired fusion reactions or other phenomena can occur for a time period which would not be available if only the linear pinch compression stage is available.

One factor which can seriously limit the temperature of the plasma is contamination from the vacuum chamber walls of the device caused by contact of the hot plasma therewith. The linear pinch process draws the plasma away from the walls so that a minimum of plasma contamination occurs. Thus the present invention retains the advantages of a linear pinch device but overcomes the instability thereof.

In addition to the compression heating, the plasma heating obtained in the invention may be further enhanced by Fermi heating which process, in generalized form, is described in the text by L. Spitzer Jr., "Physics of Fully Ionized Gases," New York, Interscience Publishers, Inc., 1956, pgs. 12–14. Fermi heating of the plasma in the present invention is produced by superimposing a high frequency component in the cusp field current so that the cusp magnetic field cyclically changes in intensity at the high frequency. The Fermi heating mechanism may be understood by considering a plasma body between two or more containing magnetic fields which are being varied in intensity at a high frequency rate. Considering one particular plasma particle which has some velocity as a result of the previous pinch or compression heating, the particle approaches the magnetic field and is deflected thereby without loss of velocity if the magnetic field is steady state. If the field is increasing in intensity during the time the particle is deflected, the velocity of the particle is increased. The effect is somewhat analogous to the action of a particle rebounding from a moving surface. The velocity of the surface is added to the original velocity of the particle. In the present invention a particle may be deflected many times by the confining magnetic fields, the effective magnetic surface velocity being added to the particle velocity with each deflection. It will be apparent that if the magnetic field is alternately increasing and decreasing in intensity at a high frequency rate, some particle deflections will produce a decrease in velocity since the field will be decreasing in intensity half the time. Considering again the analogy with the moving surface, however, it may be seen that more particles will attain an increase in velocity than will undergo a decrease. If the surface is moving in the same direction as an approaching particle, contact therebetween may be delayed until motion of the magnetic surface changes in direction, the particle then being deflected with a gain in velocity. Conversely, when the magnetic field and a particle are approaching from opposite directions, the particle impinges against the field before it would impinge if the field were stationary. Thus more particles are deflected from the approaching field than from the retreating field and the net energy of temperature of the plasma is enhanced by this effect when the average of many collisions is considered.

It is an object of the present invention to provide a highly effective means for forming, heating and containing an electrical plasma.

It is a further object of the invention to provide a plasma heating device having multiple co-acting means for forming, compressing and containing a plasma.

It is another object of this invention to provide a new means for extending the containment time of a linear pinch plasma device.

It is a further object of the invention to provide a means for heating a plasma within an enclosure with a minimum of plasma contamination from the wall material of said enclosure.

It is another object of this invention to utilize a Fermi heating effect for energizing an electrical plasma.

It is yet another object of the invention to increase the containment time and degree of heating obtainable in a plasma device of the pinch tube class.

The invention both as to its organization and method of operation, together with further objects and advantages thereof, will best be understood by reference to the following specification taken in conjunction with the accompanying drawing in which:

FIGURE 1 is a broken-out view of the invention with certain components thereof shown in schematic form, and FIGURES 2a to 2d are diagrammatic views of certain components, fields, and plasma bodies within the invention illustrating successive stages in the operation thereof.

Referring now to FIGURE 1, there is shown a cylindrical gas-tight tube 7 made of quartz or a similar insulative material. The diameter of the tube 7 varies along the axis thereof, the tube having an enlarged portion 8 at the center and a pair of narrowed portions 9 and 11 situated one on each side of portion 8. As will be discussed hereinafter, the plasma in the narrowed regions 9 and 11 is pinched slightly before the remaining plasma is pinched, causing a controlled instability which accelerates a portion of the plasma toward the central regions.

A pair of magnetic field coils 12 and 13 are disposed coaxially around the tube 7 one at each narrow portion 9 and 11 of the tube. The enlarged portion 8 of the tube 7 insures that the insulative tube walls are not within the cuspate containment region to be described later, the boundaries of such region being defined by the magnetic field from the field coils 12 and 13. Contamination of the plasma is thus avoided by inhibiting contact between the hot contained plasma and the insulative walls. Any impurities that are released from the walls are outside the containment region and must pass through the magnetic field to reach such region, thus the magnetic field serves not only to contain the plasma but is a barrier for keeping impurities out of the containment region, provided the impurities have an electrical charge.

The ends of the tube 7 are closed by a first and a second conductive end electrode 14 and 16 each having a circular groove, 17 and 18 respectively, therein for receiving the ends of the tube 7. Vacuum sealing O-rings 19 are disposed in the grooves 17 and 18 between the ends of tube 7 and the electrodes 14 and 16.

A plurality of longitudinal conductors 21 are disposed symmetrically outside the tube 7, providing a return current path from the second end electrode 16 to a terminal ring 22 which is disposed coaxially around the first end electrode 14 and which is separated therefrom by an annular insulator 23. The conductors 21 are affixed to both the terminal ring 22 and to a flange 24 on the second electrode 16 by bolts or other suitable means. It is desirable that the conductors 21 be symmetrically positioned around the azimuth of tube 7 in order to obtain a symmetrical magnetic field within the tube 7. The conductors should be comprised of some non-magnetic material such as copper which will not significantly interfere with the formation of the desired magnetic fields by the coils 12 and 13.

Considering now the external electrical connections to the tube 7 and the magnet coils 12 and 13, there is provided a magnet power supply 26 having a switch 25 for supplying high current, low voltage power to the series connected magnet coils 12 and 13. Coil connections are arranged so that the current through the coil 12 is in the opposite angular direction from that of coil 13 to obtain the desired magnetic field configuration. Where a Fermi heating effect is to be provided, additional components are provided in the magnet circuit which components include a bypass capacitor 27 connected between the magnet power supply 26 output terminals, one of which is generally at ground potential. The bypass capacitor 27 places both leads at ground potential insofar as high frequencies are concerned. Resonating capacitors 28 and 29 are connected across each of the coils 21 and 13 respectively, each capacitor combining with the inductance of the coils to form two inductance-capacitance circuits which resonate at the operating frequency of a radio frequency power supply 31 connected between ground and the juncture between the coils 12 and 13. A radio frequency bypass capacitor 32 is disposed in the ungrounded output line of the radio frequency power supply 31 to isolate the supply from the magnet power supply 26 current. The coils 12 and 13 are thus in parallel for receiving high frequency power, but are in series with regard to the magnet power supply 26.

To supply the basic pinch current a high current, high voltage power supply 33 such as capacitor bank is connected through a switch 34 to the first tube end electrode 14 and terminal ring 22. It may be desirable in many instances to utilize a plurality of coaxial cables for carrying power from the power supply 33 to the electrode 14 and terminal ring 22, the inner conductors of such cables being connected to first electrode 14 and the shield electrode conductors to terminal ring 22.

Considering now further components external to the tube 7, a vacuum pump 35 connects with the interior of the tube 7 through an opening 36 in the electrode 14 through a suitable valve 37. When the vacuum pump has evacuated the interior of the tube 7, a gas such as deuterium or tritium or a mixture thereof is introduced into the interior of the tube 7 from a gas supply 38. The gas passes through an aperture 39 in the electrode 14, the gas flow being controllable by a valve 40.

Considering now the operation of the invention, reference should be made also to FIGURES 2a to 2d wherein progressive stages in the operation of the device are shown schematically. In FIGURES 2a to 2d, only the magnet coils 12 and 13, tube 7, and the electrodes 14 and 16 have been shown to most clearly illustrate basic phenomena which occur in the apparatus. The operation of the invention will be described first without the Fermi heating effect being applied.

Figure 2B:
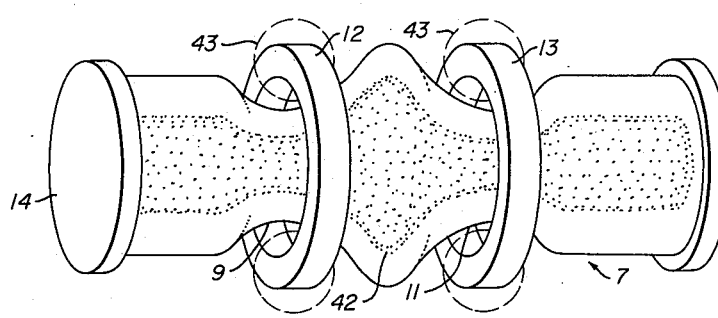

In FIGURE 2a, the invention is in the condition where tube 7 has been evacuated and filled with gas as previously described, the random distribution of the gas particles being indicated by stippled area 41. FIGURE 2b illustrates a subsequent condition wherein a high voltage has been applied between the electrodes 14 and 16 as previously described, ionizing the gas into a plasma comprised of positive ions and electrons. Since a plasma is a very good conductor, a large current passes through the plasma from electrode 14 to electrode 16. As is understood within the art, such current creates a magnetic field which constricts or pinches the plasma into a narrow configuration as indicated by stippled area 42 in FIGURE 2b. Also at this time the magnet coils 12 and 13 have been energized but the magnetic fields thereof have not as yet built up to maximum intensity owing to the inductive reactance of the coils. The low intensity magnetic field is indicated in FIGURE 2b by dashed lines 43.

As previously stated, the diameter of the tube 7 affects the rate at which pinching occurs, the portions 9 and 11 where the tube 7 diameter is constricted, as shown in FIGURE 1, causing a higher current density in such narrowed portions as compared to the wider portions since the same quantity of current passes through all portions of the tube but the cross-sectional area of the plasma conductor changes along the tube. In the narrower portions 9 and 11 of the tube 7 the magnetic field is more concentrated and pinching occurs slightly more rapidly than in the wider portions. Due to the more rapid pinch at the narrowed portions, there is an axial force in addition to the radially inward pinch force, the axial force accelerating a portion of the plasma into the central regions and improving the containment characteristics of the invention.

Figure 2C:
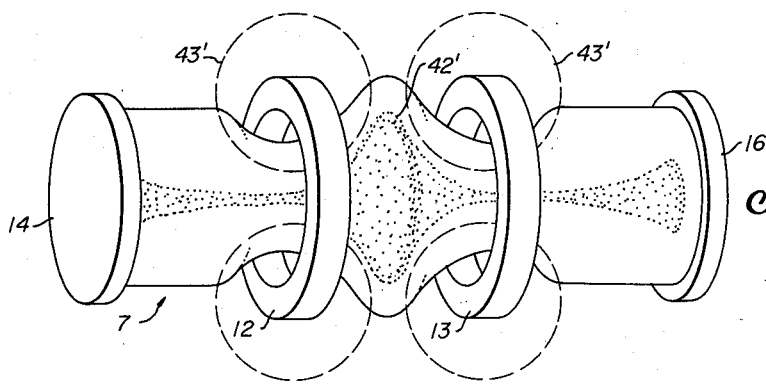

At a subsequent time the conditions shown in FIGURE 2c occur at which time the coil magnetic field, indicated by dashed lines 43', has increased in intensity over that indicated in FIGURE 2b. The portion of the plasma 42' between the planes of the field coils 12 and 13 is urged by the increasing magnetic field 43' toward a central position between the two coils. Plasma near the electrodes 14 and 16 is separated from the main central body of plasma.

Figure 2D:
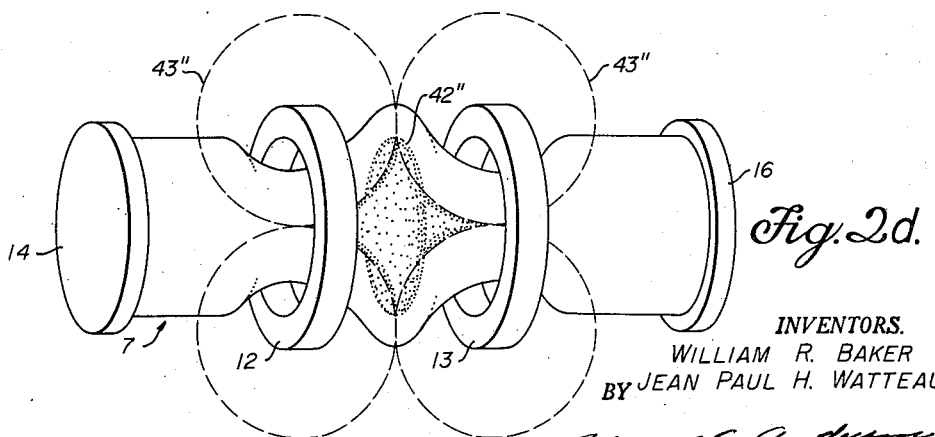

FIGURE 2d shows a still subsequent condition in which the intensity of the magnetic field 43'' has increased to a maximum and the plasma 42'' is held in a cuspate formation between coils 12 and 13.

The plasma is contained by the magnetic fields 43'' for a much longer time than is possible by relying only on the self induced pinch effect of the plasma column alone. In the increased containment time period many more nuclear reactions and interactions occur and the overall neutron yield from the device is enhanced over that of a simple pinch device. In addition to the increased containment time, the magnetic compression of the field further heats the plasma.

To effect a still greater heating of the plasma, means may be provided to apply a Fermi heating effect to the plasma. Such means includes the radio frequency power supply 31 which is activated to modulate the magnet current from the magnet power supply 26. The frequency of the modulation will typically be in the order of 5 to 10 megacycles and may have a peak to peak amplitude in the order of a few percent of the magnet power supply current. Accordingly the intensity of the magnetic field increases and decreases in magnitude at the modulation frequency. The plasma particles are alternately deflected from one magnetic surface and then another, the average result of many deflections being an increase in particle velocity and an increase in overal plasma energy or temperature as heretofore discussed.

The operation of the invention may be regulated by adjusting the timing between the applying of the pinch voltage to electrodes 14 and 16 and the commencement of the containment magnetic field by energization of coils 12 and 13. The invention will generally be operated on a pulsed basis since, as presently operated, it is necessary to periodically replace the plasma which eventually escapes through the containing magnetic field.

Variations in the invention may be made by altering the shape of the tube 7 to obtain a particular pinch characteristic. Considering other variations, power may be supplied to the electrodes 14 and 16 by direct connections from the power supply 33 instead of through the conductors 21, however there is an advantage to having the return current conducted around the outside of the tube 7 as shown in FIGURE 1. The magnetic field from the current in the outside conductor is an additional force acting radially inwardly which contributes to the pinching of the plasma. In an alternate arrangement from that shown in FIGURE 1, the return current path may also be provided through a conductive coating on the outside surface of the tube 7, the main consideration for either system being that the return current conductors should not interfere with the formation of the cuspate magnetic field.

Thus while the invention has been disclosed with respect to a specific embodiment, it will be apparent to those skilled in the art that numerous variations and modifications may be made within the spirit and scope of the invention and thus it is not intended to limit the invention except as defined in the following claims:

What is claimed is:

1. In combination with a plasma heating and containment device of the pinch class wherein a self constricting gaseous electrical discharge is established between spaced apart electrodes, a magnetic field generating element providing a field within the region between said electrodes which field is symmetrical about an axis extending between said electrodes and of reduced intensity at a region between said electrodes.

2. In a plasma containment device, the combination comprising a vacuum enclosure, a gas supply communicating with said enclosure, a first and a second electrode spaced apart along an axis within said enclosure, an electrical power supply for establishing a potential difference between said electrodes, and a magnetic field generating element providing a field between said electrodes which field is symmetrical about said axis and oppositely directed on each side of an intermediate point on said axis.

3. In a plasma generating, containing and heating device, the combination comprising a vacuum enclosure, a first and a second electrode spaced apart within said enclosure, an electrode power supply connected to said first and second electrode, a vacuum pump communicated with the interior of said enclosure, a gas supply communicated with the interior of said enclosure, a first and second annular coil disposed around said enclosure, said coils being coaxial and being spaced apart, and a power supply coupled to said coils and supplying oppositely directed currents through each thereof whereby a cuspate magnetic field may be established within said enclosure and between said first and second electrodes.

4. Apparatus as described in claim 3 and further characterized by means cyclically varying the current through said first and second coil at a high frequency rate, whereby a plasma contained within said enclosure is subjected to an additional heating effect.

5. Apparatus for generating, containing and heating an electrical plasma comprising, in combination, a vacuum enclosure, a pair of electrodes spaced apart within said enclosure, means for supplying gas to said enclosure, a pair of spaced apart annular field coils each encircling an axis extending between said electrodes, a first switch means, a first power supply coupled between said spaced apart electrodes through said first switch means, a second switch means, a second power supply controlled by said second switch means and coupled to said field coils to provide oppositely directed currents therein, and a timing element controlling closing of said first switch means relative to closing of said second switch means.

6. Apparatus as described in claim 5 and comprising the further combination of capacitance means coupled across each of said field coils and forming a resonant circuit therewith, and an oscillator coupled to said resonant circuit to cause the field of said coils to vary in a cyclical manner whereby a plasma within said enclosure is subjected to an additional heating effect.

7. In a plasma generating, containing and heating device, the combination comprising an insulative gas-tight tube having a diametrically enlarged portion, a first and a second electrode disposed within said tube one at each side of said enlarged portion thereof, a vacuum pump communicating with the interior of said tube, a gas supply communicating with the interior of said tube, and magnetic field generating means creating a field within said enlarged portion of said tube which field is symmetrical about the axis thereof and oppositely directed at each side of the midpoint of said enlarged portion of said tube.

8. In a plasma device, the combination comprising an electrically insulative gas-tight tube having a portion of enlarged diameter with a constricted portion on each side thereof, a first and a second electrode disposed within said tube one at each side of said enlarged and constricted portions of said tube, a first power supply means for applying a potential difference between said electrodes, means for evacuating the interior of said tube, means supplying gas to the interior of said tube, a pair of coaxial annular field coils disposed one around each of said constricted portions of said tube, and a second power supply connected to said magnet coils to supply a current to said coils which current is oppositely directed in each of said coils.

9. Apparatus for generating, containing and heating a plasma comprising, in combination, an electrically insulative gas-tight cylinder having a diametrically enlarged portion and a diametrically reduced portion at each side thereof, means for evacuating said cylinder, means for supplying gas to said cylinder, a pair of spaced apart electrodes disposed within said cylinder one on each side of said enlarged and reduced portion thereof, a first switch, a first power supply coupled between said electrodes through said first switch, a pair of coaxial annular field coils encircling said cylinder one at each of said reduced portions thereof, a second switch, a second power supply controlled by said second switch and connected to said field coils, said second power supply being connected to provide oppositely directed currents to said pair of coils, and a timing means controlling the closing of said first switch relative to the closing of said second switch.

10. In a device for generating, containing and heating an electrical plasma, the combination comprising a gastight cylinder formed of insulative material and having a diametrically enlarged portion at the center, means for evacuating said cylinder, means for supplying a gas to said cylinder, a pair of electrodes disposed within said cylinder one at each end thereof and each having a broad surface area facing said center of said cylinder, a first switch means, a first direct current power supply connected between said electrodes through said first switch means, a pair of spaced apart annular field coils disposed coaxially around said cylinder one at each side of said enlarged center portion thereof, a second switch means, a second direct current power supply controlled by said second switch means and connected to each of said field coils to provide an oppositely directed current in each thereof, timing means regulating the closing of said first switch means relative to the closing of said second switch means, capacitance means connected across each of said field coils and forming a resonant circuit therewith, and an oscillator coupled to said resonant circuit to cyclically vary the field of said coils.

References Cited in the file of this patent

UNITED STATES PATENTS

| | | |
|---|---|---|
| 2,997,436 | Little et al. | Aug. 22, 1961 |
| 3,003,080 | Post | Oct. 3, 1961 |